United States Patent
Revol et al.

(10) Patent No.: US 8,878,722 B2
(45) Date of Patent: Nov. 4, 2014

(54) METHOD AND SYSTEM FOR DETERMINING NAVIGATION PARAMETERS OF AN AIRCRAFT

(75) Inventors: Marc Revol, Upic (FR); Jacques Mandle, Saint Peray (FR); Alain Bibaut, Igny (FR); Jacques Coatantiec, Fauconnieres (FR)

(73) Assignee: Thales, Neuilly-sur-Seine (FR)

( * ) Notice: Subject to any disclaimer, the term of this patent is extended or adjusted under 35 U.S.C. 154(b) by 463 days.

(21) Appl. No.: 13/396,518

(22) Filed: Feb. 14, 2012

(65) Prior Publication Data
US 2012/0212369 A1    Aug. 23, 2012

(30) Foreign Application Priority Data

Feb. 17, 2011    (FR) .................................... 11 00488

(51) Int. Cl.
| | |
|---|---|
| *G01S 19/52* | (2010.01) |
| *G01S 19/53* | (2010.01) |
| *G01P 21/02* | (2006.01) |
| *G01P 1/16* | (2006.01) |

(52) U.S. Cl.
CPC ............. *G01S 19/53* (2013.01); *G01P 21/025* (2013.01); *G01S 19/52* (2013.01); *G01P 1/16* (2013.01)
USPC .................................................... 342/357.35

(58) Field of Classification Search
CPC ....................................................... G01S 19/52
USPC ..................................................... 342/357.35
See application file for complete search history.

(56) References Cited

U.S. PATENT DOCUMENTS

| | | |
|---|---|---|
| 5,787,384 A | 7/1998 | Johnson |
| 2003/0149512 A1 | 8/2003 | Hrovat et al. |

FOREIGN PATENT DOCUMENTS

| | | |
|---|---|---|
| DE | 02004034894 A1 | 3/2006 |
| EP | 1837675 A1 | 9/2007 |
| RU | 2436046 C1 * | 12/2011 |
| RU | 2436047 C1 * | 12/2011 |

* cited by examiner

*Primary Examiner* — Harry Liu
(74) *Attorney, Agent, or Firm* — Michael J. Donohue; Davis Wright Tremaine LLP

(57) ABSTRACT

Method for determining navigation parameters of an aircraft, characterized in that it consists at least in determining the geographic speed $\vec{V}$, expressed in a given local fixed coordinate system $\{\vec{i}, \vec{j}, \vec{k}\}$, based on the measurements $m_i$ of carrier phase increments $\Delta \phi_i$ of the radio navigation signals originating from a plurality of radio navigation satellites in sight of said aircraft, each of said measurements $m_i$ constituting an estimate of the relative speed of said aircraft relative to said satellite projected onto the sight axis linking the aircraft to the satellite, each of said measurements $m_i$ being compensated by the apparent radial speed of the satellite.

20 Claims, 2 Drawing Sheets

METHOD AND SYSTEM FOR DETERMINING NAVIGATION PARAMETERS OF AN AIRCRAFT

FIELD OF THE INVENTION

The subject of the present invention is a method and a system for determining navigation parameters, notably the route and the attitude, of an aircraft. The field of the invention is that of air navigation and relates to any type of aircraft, with or without a pilot.

The invention relates in particular to the field of satellite radio navigation.

The invention also relates to the field of securing and monitoring the integrity of the anemometric systems delivering anemobaroclinometric measurements, called primary measurements, enabling the aircraft to be positioned relative to the mass of air.

BACKGROUND OF THE INVENTION

The sensors which position an aircraft relative to the mass of air, called anemobaroclinometric sensors, deliver fundamental measurements for the aircraft and its safety. Conventionally, these measurements relate to four physical quantities: total pressure, static pressure, temperature (total or static) and incidence. From these primary measurements, elaborate navigation parameters are constructed such as, for example, the conventional speed of the aircraft relative to the air, the pressure at altitude, the incidence or even the Mach number. Without these parameters, the aircraft cannot fly safely. All of these parameters are processed by a central unit, of anemobarometric type, usually redundant, which constitutes the conventional or primary pathway for processing all the information necessary to the navigation of the aircraft.

Given the fundamental nature of the anemobarometric measurements for the safety of an aircraft, it is important to design a backup or secondary pathway, in order to replace, where necessary, the operational pathway in case of failure of the operational pathway and/or to ensure control of the integrity of the measurements that it performs.

The anemobarometric units, which notably comprise Pitot probes coupled to static pressure probes, have the advantage of being able to directly supply a measurement of the modulus of the conventional speed of the aircraft relative to the air. This information is critical to the piloting of the aircraft. In practice, if this speed is too high, the aircraft may be damaged; if too low, it may stall and drop. By associating this measurement with an estimation of the heading (made, for example, by a magnetometer), it is possible to determine the speed vector of the aircraft relative to the air. The real speed of movement then results from the compounding of the speed of the aircraft relative to the air with the average wind speed.

To ensure that the information delivered by an anemobarometric unit is secured, it is known to implement a backup system which must supply a second estimation of the conventional speed of the aircraft relative to the air. The usual backup systems to this end implement methods identical to those used by the operational pathway, that is to say, based on the use of Pitot probes and static pressure probes.

Thus, the measurements performed by the backup pathway are not independent of those delivered by the operational pathway since they are exposed to common failure modes.

To resolve this problem, it is therefore best to implement a backup system which uses measurement means that are different from those of the operational pathway in order to ensure an independent integrity control and reduce the probability of simultaneous failure of both pathways.

One solution to the abovementioned problem consists in using satellite radio navigation systems, also called GNSS (Global Navigation Satellite System) signals, to measure the route and attitude of the aircraft.

The applicant's French patent No. 01 16561 relating to a "method for improving the determination of the attitude of a vehicle using satellite radio navigation signals", describes the use of satellite radio navigation signals to measure carrier attitude and heading but restricted to the implementation of at least two antennas that are several wavelengths apart.

This solution presents the drawback of requiring at least two GNSS antennas and increasing the overall dimension in the aircraft. Furthermore it brings difficulties in synchronizing the two antennas to which are also added problems of resolving ambiguity concerning the carrier phase deviation measured from the two distant antennas.

One general limitation to the use of the satellite radio navigation signals for air navigation lies in the vulnerability of the GNSS receivers with regard to the availability of the signals or the various disturbances linked to the propagation environment, such as the interferences, multiple paths or scrambling problems. These disturbances are likely to result in significant measurement biases, phase skips and even dropouts of the phase tracking loops thus rendering the service temporarily unavailable.

Although this vulnerability of the GNSS systems has hitherto slowed down their use as primary navigation instrument for an aircraft, they are perfectly compatible with the performance requirements of a backup navigation system having a sufficient availability and accuracy to control the integrity of the measurements supplied by the main system.

SUMMARY OF THE INVENTION

In this context, the object of the invention is to propose a backup air navigation solution based on the use of radio navigation signals. One advantage of the invention is that it requires the use of only a single antenna unlike the solutions of the prior art.

The subject of the invention is thus a method for determining navigation parameters of an aircraft, characterized in that it consists at least in determining the geographic speed $\vec{V}$ of said aircraft, expressed in a given local fixed coordinate system $\{\vec{i}, \vec{j}, \vec{k}\}$, obtained from the measurements $m_i$ of carrier phase increments $\Delta\phi_i$ of the radio navigation signals originating from a plurality of the radio navigation satellites in sight of said aircraft and received by a single antenna, each of said measurements m, constituting an estimate of the relative speed of said aircraft relative to said satellite projected onto the sight axis linking the aircraft to the satellite, each of said measurements m, being compensated by the apparent radial speed of the satellite.

In a particular embodiment of the invention, the geographic speed $\vec{V}$ is obtained by applying the least squares method to the resolving of the matrix equation $m = H\vec{V} + b$, in which m is a vector whose components are said measurements $m_i$ of carrier phase increments of each of the radio navigation signals received, b is a vector whose components are the measurement errors, for example due to the thermal noise, affecting said measurements $m_i$, H is the matrix of change of the coordinate system of the satellite sight axes towards said local coordinate system $\{\vec{i}, \vec{j}, \vec{k}\}$.

In a particular embodiment, the method according to the invention also consists in determining the acceleration $\vec{\gamma}$ of said aircraft in said local coordinate system $\{\vec{i}, \vec{j}, \vec{k}\}$, based on a measurement $\vec{\gamma}_i$ of the derivative over a given time period of said phase increments $\Delta\phi_i$, each of said derivative measurements $\vec{\gamma}_i$ constituting an estimate of the relative acceleration of said aircraft relative to said satellite projected onto the sight axis between the aircraft and the satellite to which is added the apparent acceleration $\vec{\gamma}_i^a$ of the satellite in the direction of said sight axis to obtain the total acceleration $\vec{\gamma}_i^p$ of the aircraft in the satellite sight axis.

In a particular embodiment of the invention, the acceleration $\vec{\gamma}$ of said aircraft in said local coordinate system is obtained by applying the least squares method to resolving the matrix equation $\vec{\gamma}^P = H\vec{\gamma} + b'$, in which $\vec{\gamma}^P$ is a vector whose components are the measurements $\vec{\gamma}_i^P$ of total acceleration of the aircraft on each satellite sight axis, b' is a vector whose components are the measurement errors affecting said integration measurements $\vec{\gamma}_i$, H is the matrix of change of the coordinate system of the satellite sight axes towards said local coordinate system $\{\vec{i}, \vec{j}, \vec{k}\}$.

In a particular embodiment, the method according to the invention also consists in determining the roll angle $\Phi$ of the aircraft based on the geographic speed $\vec{V}$ of the aircraft expressed in the geographic coordinate system {north, east, centre} and the specific force $\vec{f}$ applied to said aircraft, said force $\vec{f}$ being deduced from the acceleration $\vec{\gamma}$ by subtracting from it the Earth's gravitational field, the roll angle $\Phi$ being calculated using the following relationship:

$$\Phi = a\tan\left(\frac{v_n \cdot f_{H_e}(\vec{v}) - v_e \cdot f_{H_n}(\vec{v})}{-f_{H_c}(\vec{v})}\right)$$

in which $v_n$ and $v_e$ are the normed components of the direction of the geographic speed $\vec{V}$ on the east and north axes of the local coordinate system {north, east, centre} and $\vec{f}_H(\vec{v}) = \vec{f} - (\vec{f} \cdot \vec{v})\vec{v}$ is the projection, on the plane orthogonal to the displacement of the aircraft, of the specific force $\vec{f}$.

In a particular embodiment, the method according to the invention also consists in determining the pitch angle $\theta$ on the basis of the geographic speed $\vec{V}$ of the aircraft expressed in the geographic coordinate system {north, east, centre}, for example by the following calculation: $\theta = \arcsin(-v_c)$, in which $v_c$ is the projection of the normed geographic speed $\vec{V}$ onto the centre axis of said coordinate system.

In a particular embodiment, the method according to the invention also consists in determining the speed $\vec{V}_{air}$ of said aircraft relative to the air by subtracting from the geographic speed $\vec{V}$ of said aircraft an estimate of the wind speed $\vec{V}_{vent}$.

In a particular embodiment, the method according to the invention also consists in determining the heading angle $\psi$ based on the speed $\vec{V}_{air}$ of the aircraft relative to the air expressed in the geographic coordinate system {north, east, centre}, for example by the following calculation:

$$\Psi = \arctan\left(\frac{V_{air_e}}{V_{air_n}}\right)$$

with $v_{air_e}$, $v_{air_n}$ being the respective projections of the normed air speed on the east and north axes of the local coordinate system {north, east, centre}.

In a particular embodiment, the method according to the invention also consists in carrying out a check on the integrity of the speed information delivered by one or more anemometric systems that the aircraft includes by comparison with the speed $\vec{V}_{air}$ of the aircraft relative to the air.

In a variant embodiment, the method according to the invention also consists in carrying out a check on the integrity of the anemometric speed information delivered by one or more anemometric systems that the aircraft includes by comparing the variation of said anemometric speed with the variation of the geographic speed $\vec{V}$.

In a variant embodiment, the method according to the invention consists in carrying out a preliminary check on the integrity of the radio navigation signals received by applying a method of independently checking the integrity of the measurements.

Also the subject of the invention is a system for determining navigation parameters of an aircraft, installed in said aircraft, comprising at least one single-antenna radio navigation receiver and calculation means suitable for implementing the method according to the invention.

BRIEF DESCRIPTION OF THE DRAWINGS

Other features and advantages of the invention will become apparent from the following description given in light of a single appended drawing which represents, in FIG. 1, an illustration of the method according to the invention that makes it possible to determine the speed of the carrier from a single individual GNSS antenna receiving radio navigation signals originating from a plurality of satellites.

MORE DETAILED DESCRIPTION

Figure 1:
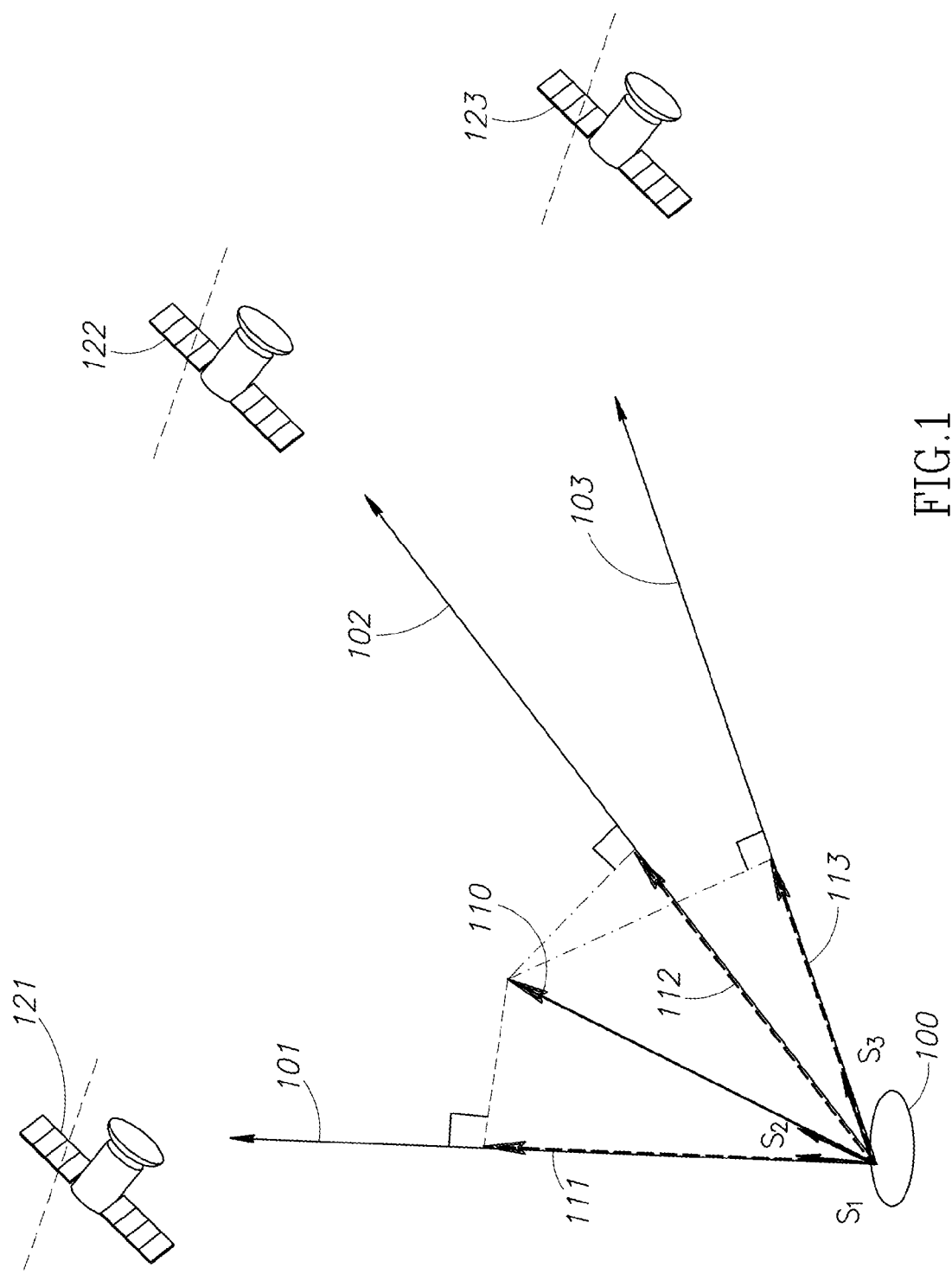

Checking the Integrity of the Anemometric Systems

One of the objectives targeted by the present invention is to propose a check on the integrity of the onboard anemometric systems on the aircraft and/or to complement the backup instrumentation.

To this end, the invention makes it possible to determine the real geographic speed $\vec{V}$ of the aircraft in a local terrestrial coordinate system. The method according to the invention that makes it possible to obtain an estimate of this speed from a single GNSS antenna is developed hereinafter in the description. From the knowledge of the geographic speed $\vec{V}$, it is possible to form, by comparison, a check on the speed measurements supplied by the anemometric system or systems. The comparison of the measurement of speed of the aircraft relative to the air (also called air speed), supplied by the anemometric system, with that of the geographic speed, supplied by the invention, implies having an estimation of the wind speed. After correction of the geographic speed by the wind speed at the current altitude, the result is compared to the air speed supplied by the anemometric system or systems in order to check its integrity and detect any inconsistency resulting from a failure of one or more systems.

In a variant embodiment, the integrity check can be performed differently by comparing the variations of the air speed with those of the geographic speed, obtained after filtering and compensating the static pressures. The advantage of this variant is that it does not require the knowledge of the wind speed, the latter being assumed to be constant throughout the measurement.

The comparison of the measurements of speeds, or of speed variations, leads either to confirming the integrity of the air speed measurement when the deviation between the measurements is below a given threshold or in alerting to a failure of one or more anemometric systems when this deviation is above the same threshold.

In the case where all the available anemometric systems are declared to have failed, the backup system according to the invention is implemented to maintain the trajectory of the aircraft relative to the air and maintain its attitude.

Determining the Route of the Aircraft

There now follows the description of the method, according to the invention, for determining, from a single GNSS receiver comprising an individual antenna, the route of the aircraft, that is to say its speed and its heading, in the local geographic coordinate system. Hereinafter, the term carrier designates the aircraft on which the GNSS receiver is installed and the means for implementing the invention.

The route of the carrier in the local geographic coordinate system can be estimated from a plurality of radio navigation signals and in particular from the trend of the phase of the carrier wave observed in the sight axis of each of the satellites. The trend of the phase is indicative of the frequency variation due to the Doppler effect, which is in turn linked to the trend of the distance between the satellite and the carrier, therefore to the speed of the carrier in a coordinate system linked to the satellite. Since the apparent Doppler frequency variation of the satellite is relatively slow and follows a known trend, it is possible to reconstruct the Doppler frequency variation specific to the kinematics of the carrier with regard to each sight axis linking the carrier to a satellite. Furthermore, the measurements of carrier phase increments, consistent with the Doppler frequency, can be consolidated by using algorithms for independently checking the integrity of these measurements, for example by using the method known by the acronym RAIM (Receiver Autonomous Integrity Monitoring). Such algorithms make it possible to detect and correct any defects affecting the radio navigation signal and, indirectly, the phase measurements performed from the latter and which are used as a basis for the method according to the invention for determining navigation parameters.

FIG. 1 diagrammatically represents the geographic speed vector 110 of the carrier 100 and its projections 111,112,113 in the direction of each satellite sight axis 101,102,103. The unitary directing vectors of each satellite sight axis are denoted $s_1, s_2, s_3$ and generally $s_i$ in which i is the index associated with a sight axis linking an onboard radio navigation receiver on the carrier 100 and a satellite 121,122,123 in sight of this receiver. FIG. 1 represents, in the interest of clarity, an example for which three satellites are used, but the invention similarly applies to any number of satellites.

Let $\{\vec{i}, \vec{j}, \vec{k}\}$ be a fixed local geometrical coordinate system relative to the Earth. The unitary directing vector $s_i$ is expressed, in this coordinate system, using the following relationship:

$$\vec{s_i} = \cos(El^i)\cos(Az^i)\vec{i} + \cos(El^i)\sin(Az^i)\vec{j} + \sin(El^i)\vec{k} \quad (1)$$

The angle $El^i$ is the angle of elevation of the sight axis of index i. The angle $Az^i$ is the azimuth angle of the sight axis of index i. These angles are determined from the knowledge of the position and of the movement of the radio navigation satellites in sight of the carrier 100. This information is created using the almanacs and ephemerides transmitted periodically by the satellites to the receivers.

The onboard GNSS receiver on the carrier 100 delivers, from the signal transmitted by each satellite of index i, a measurement $m_i = \Delta\phi_i$ of the phase increment of the carrier wave. This measurement is supplied by reading between two instants the trend of the phase of the carrier phase loop implemented by the radio navigation receiver. This phase is consistent with a propagation time deviation, therefore with a displacement in the axis of the satellite. These measurements therefore intrinsically contain the speed information of the carrier relative to the satellite, projected onto the satellite sight axis. From these radial speed measurements and the knowledge through the ephemerides of the radial speed of the satellite, which is virtually constant between two consecutive instants, it is possible to determine the components $\omega_X, \omega_Y$ and $\omega_Z$ of the speed 110 of the carrier in the local geographic coordinate system $\{\vec{i}, \vec{j}, \vec{k}\}$ by resolving the following equations. The measurements $m_i$ are first compensated by the radial speed of the satellite.

$$\begin{bmatrix} m_1 \\ m_2 \\ \vdots \\ m_n \end{bmatrix} = \begin{bmatrix} \vec{i} \circ \vec{s_1} & \vec{j} \circ \vec{s_1} & \vec{k} \circ \vec{s_1} \\ \vec{i} \circ \vec{s_2} & \vec{j} \circ \vec{s_2} & \vec{k} \circ \vec{s_2} \\ \vdots & \vdots & \vdots \\ \vec{i} \circ \vec{s_n} & \vec{j} \circ \vec{s_n} & \vec{k} \circ \vec{s_n} \end{bmatrix} \begin{bmatrix} \omega_X \\ \omega_Y \\ \omega_Z \end{bmatrix} + \begin{bmatrix} b_1 \\ b_2 \\ \vdots \\ b_n \end{bmatrix} \quad (2a)$$

or else $$m = H\omega + b \quad (2b)$$

n is the number of satellites in sight of the GNSS receiver, H is the matrix of change of coordinate system allowing for a transition from the coordinate system of the sight axes $\{\vec{s_1}, \vec{s_2}, \ldots \vec{s_n}\}$ to the local coordinate system $\{\vec{i}, \vec{j}, \vec{k}\}$, and $b_i$ represents the assumed centred Gaussian thermal noise, of standard deviation a which affects the measurements performed on the radio navigation signals. The ° symbol between vectors of the matrix H represents the projection operation.

The equation (2a) can be resolved by the least squares method. The state vector of the carrier speed is then estimated using the following relationship:

$$\hat{\omega} = (H^T H)^{-1} H^T m \quad (3)$$

The vector of the estimation errors is obtained using the following relationship:

$$\tilde{\omega} = \omega - \hat{\omega} = -(H^T H)^{-1} H^T b \quad (4)$$

The covariance matrix of the errors is then given by the relationship (5), by assuming a normal distribution of the residual noise.

$$Var(\tilde{\omega}) = E[(\omega - \hat{\omega})(\omega - \hat{\omega})^T] \quad (5)$$
$$= (H^T H)^{-1} H^T R H (H^T H)^{-1}$$

in which $R = E(bb^T)$ is the covariance matrix of the noise alone.

Assuming that the standard deviation of the measurement noise of the phase increments for each sight axis is identical and equal to $\sigma_b$, then the error matrix of the estimate becomes:

$$\mathrm{Var}(\tilde{\omega}) = \sigma_b^2 (H^T H)^{-1} \quad (6a)$$

or else, in normalized form:

$$\Sigma = \frac{\mathrm{Var}(\tilde{\omega})}{\sigma_b^2} = (H^T H)^{-1} \quad (6b)$$

The square root of the plot of this variance gives an indication that can be used to estimate the accuracy obtained on the geographic speed vector $$\vec{V} = \begin{bmatrix} \omega_X \\ \omega_Y \\ \omega_Z \end{bmatrix}.$$

The air speed of the aircraft is then estimated by subtracting the wind speed from the geographic speed: $\vec{V}_{air} = \vec{V} - \vec{V}_{vent}$. The wind speed used is that of the last secured estimation supplied by the primary system or is determined by the backup instrument.

From the direction vector $$\vec{v} = \frac{\vec{V}}{|\vec{V}|}$$

of the geographic speed and of its projection $v_c$ on the centre axis of the local coordinate system {north, east, centre}, an estimate of the pitch angle $\theta = \arcsin(-v_c)$ is deduced therefrom.

From the air speed $\vec{V}_{air}$, the normalized air speed $$\vec{v}_{air} = \frac{\vec{V}_{air}}{|\vec{V}_{air}|}$$

and finally the heading angle $$\Psi = \arctan\left(\frac{v_{air_e}}{v_{air_n}}\right)$$

with $v_{air_e}, v_{air_n}$ the respective projections of the normalized air speed on the east and north axes of the local coordinate system {north, east, centre} are deduced.

Determining the Attitude of the Aircraft

In the case where all the anemometric systems of the primary pathway are unusable, because they are subject to common failure causes, the invention also makes it possible to determine and maintain the attitude of the carrier from the measurements delivered by a single-antenna radio navigation receiver.

As described previously, the heading and pitch angles can be derived from the geographic speed of the aircraft. To complete the attitude angles, the roll angle must also be determined.

To this end, the method according to the invention uses the measurements of accelerations of the phase of the carrier of the radio navigation signals transmitted by each of the satellites in sight of the receiver. The term acceleration of the phase designates a quantity consistent with the derivative of the increment of the phase. This measurement is linked to the relative acceleration between the satellite and the carrier by the equations detailed below.

The measurements of accelerations of the phase are obtained by derivation of the phase increment measurements, which are consistent with speed information, supplied by the phase tracking loop of the radio navigation receiver for each satellite sight axis and over a given time period $\Delta t$, for example a period of 100 ms.

The aircraft is in motion in the Earth's gravitational field $\vec{g}$ and is subject to a set of forces, including gravity, which give it an absolute acceleration $$\vec{\gamma} = \begin{bmatrix} \gamma_X \\ \gamma_Y \\ \gamma_Z \end{bmatrix}$$

in the local geographic coordinate system. The specific force, also called static acceleration, is defined by the vector $\vec{f}$ linked to the absolute acceleration of the carrier and to the gravitational field by the following relationship:

$$\vec{f} = \vec{\gamma} - \vec{g} \quad (7)$$

The gravitational field $\vec{g}$ can be determined from values precalculated for a set of positions of the carrier predefined by performing an interpolation of these values to deduce therefrom the gravitational field at the current position of the carrier. It can also be determined using an inertial system on board the carrier.

The determination of the absolute acceleration $\vec{\gamma}$, from the acceleration of the phase for each satellite sight axis, thus makes it possible to reconstruct the vector of the specific forces seen by the carrier and, indirectly, its attitude.

The acceleration of the phase, for each satellite sight axis of index i, is determined by derivation of the phase increment measurement $\Delta\phi$ over a given time period $\Delta t$. It can thus be calculated by using, for example, the following relationship:

$$\vec{\gamma}_i = \frac{c}{f_0} \frac{(\Delta\varphi_k - \Delta\varphi_{k-1})}{\Delta t^2/2} \vec{u}_i \quad (8)$$

$f_0$ is the carrier frequency of the radio navigation signal received by the receiver, c is the speed of light, $\Delta t$ is the integration period which corresponds, for example, to the sampling period of the phase integrated and filtered by the phase tracking loop of the radio navigation receiver, $\Delta\phi_k$ and $\Delta\phi_{k-1}$ are the phase increments estimated at two successive instants, $\vec{u}_i$ is the unitary vector of the sight axis towards the satellite of index i.

From the measurement of the phase acceleration, in the satellite sight axis of index i, the acceleration of the carrier is determined, in the satellite sight axis of index i, by adding the apparent acceleration of the satellite in the direction of the sight axis borne by the vector $\vec{u}_i$. The acceleration of the carrier in the sight axis of index i is thus given by the following relationship:

$$\vec{\gamma}_i^p = \vec{\gamma}_i + \vec{\gamma}_i^a = \vec{\gamma}_i + (\vec{\gamma}_i^s \cdot \vec{u}_i)\vec{u}_i \qquad (9)$$

$\vec{\gamma}_i^s$ is the acceleration of the satellite determined from the knowledge of the ephemerides and almanacs transmitted by said satellite to the radio navigation receiver to keep it permanently informed of the trend of its position.

In a variant embodiment of the invention, the phase acceleration measurements can first be rid of the variations due to the Doppler effect inherent in the delays induced on the radio navigation signal as it passes through the ionospheric layers of the atmosphere.

From the estimation of the accelerations of the carrier in each of the satellite sight axes, the absolute acceleration of the carrier in the local geographic coordinate system $\{\vec{i}, \vec{j}, \vec{k}\}$ is determined by using the least squares method detailed above for its application in determining the absolute speed of the carrier from the phase increment measurements.

The equation to be resolved in this case is as follows:

$$\begin{bmatrix} \gamma_1^p \\ \gamma_2^p \\ \vdots \\ \gamma_n^p \end{bmatrix} = \begin{bmatrix} \vec{i} \circ \vec{s_1} & \vec{j} \circ \vec{s_1} & \vec{k} \circ \vec{s_1} \\ \vec{i} \circ \vec{s_2} & \vec{j} \circ \vec{s_2} & \vec{k} \circ \vec{s_2} \\ \vdots & \vdots & \vdots \\ \vec{i} \circ \vec{s_n} & \vec{j} \circ \vec{s_n} & \vec{k} \circ \vec{s_n} \end{bmatrix} \begin{bmatrix} \gamma_X \\ \gamma_Y \\ \gamma_Z \end{bmatrix} + \begin{bmatrix} b'_1 \\ b'_2 \\ \vdots \\ b'_n \end{bmatrix} \qquad (10)$$

$b'_i$ represents the assumed centred Gaussian thermal noise, of standard deviation $\sigma'_i$ Once the absolute acceleration of the carrier in the local geographic coordinate system has been determined, it is possible to deduce therefrom the specific force applied to the carrier using the relationship (7).

The specific force $\vec{f}$ is then projected onto the plane orthogonal to the displacement of the aircraft in order to obtain the force $\vec{f}_H(\vec{v})$ as follows:

$$\vec{f}_H(\vec{v}) = \vec{f} - (\vec{f} \cdot \vec{v})\vec{v} \qquad (11)$$

Finally, the roll angle is determined using the relationship (12).

$$\Phi = a\tan\left(\frac{v_n \cdot f_{H_e}(\vec{v}) - v_e \cdot f_{H_n}(\vec{v})}{-f_{H_c}(\vec{v})}\right) \qquad (12)$$

$v_n$ and $v_e$ are the normed components of the direction of the absolute speed $\vec{v}$ on the east and north axes of the local coordinate system {north, east, centre}.

Figure 2:
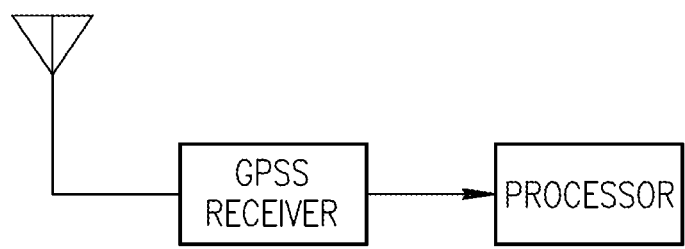
FIG. 2 illustrates a system designed to carry out the described measurements.

As illustrated in FIG. 2, the invention is implemented by onboard computation means on the aircraft and coupled to a single-antenna radio navigation receiver, for example a GPS receiver or a Galileo receiver.

The invention claimed is:

1. Method for determining navigation parameters of an aircraft, wherein it consists at least in determining the geographic speed $\vec{V}$ of said aircraft, expressed in a given local fixed coordinate system $\{\vec{i}, \vec{j}, \vec{k}\}$, based on the measurements $m_i$ of carrier phase increments $\Delta\phi_i$ of the radio navigation signals originating from a plurality of radio navigation satellites in sight of said aircraft and received by a single antenna, each of said measurements m, constituting an estimate of the relative speed of said aircraft relative to said satellite projected onto the sight axis linking the aircraft to the satellite, each of said measurements $m_i$ being compensated by the apparent radial speed of the satellite.

2. Method according to claim 1, wherein the geographic speed $\vec{V}$ is obtained by applying the least squares method to the resolving of the matrix equation $m = H\vec{V} + b$, in which m is a vector whose components are said measurements $m_i$ of carrier phase increments of each of the radio navigation signals received, b is a vector whose components are the measurement errors, for example due to the thermal noise, affecting said measurements $m_i$, H is the matrix of change of the coordinate system of the satellite sight axes towards said local coordinate system $\{\vec{i}, \vec{j}, \vec{k}\}$.

3. Method according to claim 1, wherein it also consists in determining the acceleration $\vec{\gamma}$ of said aircraft in said local coordinate system $\{\vec{i}, \vec{j}, \vec{k}\}$, based on a measurement $\vec{\gamma}_i$ of the derivative over a given time period of said phase increments $\Delta\phi_i$, each of said derivative measurements $\vec{\gamma}_i$ constituting an estimate of the relative acceleration of said aircraft relative to said satellite projected onto the sight axis between the aircraft and the satellite to which is added the apparent acceleration $\vec{\gamma}_i^a$ of the satellite in the direction of said sight axis to obtain the total acceleration $\vec{\gamma}_i^p$ of the aircraft in the satellite sight axis.

4. Method according to claim 3, wherein the acceleration $\vec{\gamma}$ of said aircraft in said local coordinate system is obtained applying the least squares method to resolving the matrix equation $\vec{\gamma}^p = H\vec{\gamma} + b'$, in which $\vec{\gamma}^p$ is a vector whose components are the measurements $\vec{\gamma}_i^p$ of total acceleration of the aircraft on each satellite sight axis, b' is a vector whose components are the measurement errors affecting said integration measurements $\vec{\gamma}_i$, H is the matrix of change of the coordinate system of the satellite sight axes towards said local coordinate system $\{\vec{i}, \vec{j}, \vec{k}\}$.

5. Method according to claim 3, wherein it also consists in determining the roll angle $\Phi$ of the aircraft based on the geographic speed $\vec{V}$ of the aircraft expressed in the geographic coordinate system {north, east, centre} and the specific force $\vec{f}$ applied to said aircraft, said force $\vec{f}$ being deduced from the acceleration $\vec{\gamma}$ by subtracting from it the Earth's gravitational field, the roll angle $\Phi$ being calculated using the following relationship:

$$\Phi = a\tan\left(\frac{v_n \cdot f_{H_e}(\vec{v}) - v_e \cdot f_{H_n}(\vec{v})}{-f_{H_c}(\vec{v})}\right)$$

in which $v_n$ and $v_e$ are the normed components of the direction of the geographic speed $\vec{V}$ on the east and north axes of the local coordinate system {north, east, centre} and $\vec{f}_H(\vec{v}) = \vec{f} - (\vec{f} \cdot \vec{v})\vec{v}$ is the projection, on the plane orthogonal to the displacement of the aircraft, of the specific force $\vec{f}$.

6. Method according to claim 1, wherein it also consists in determining the pitch angle $\theta$ on the basis of the geographic speed $\vec{V}$ of the aircraft expressed in the geographic coordinate system {north, east, centre}, for example by the following calculation: θ=arcsin(−$v_c$), in which $v_c$ is the projection of the normed geographic speed $\vec{V}$ onto the centre axis of said coordinate system.

7. Method according to claim 1, wherein it also consists in determining the speed $\vec{V}_{air}$ of said aircraft relative to the air by subtracting from the geographic speed $\vec{V}$ of said aircraft an estimate of the wind, speed $\vec{V}_{vent}$.

8. Method according to claim 7, wherein it also consists in determining the heading angle ψ based on the speed $\vec{V}_{air}$ of the aircraft relative to the air expressed in the geographic coordinate system {north, east, centre}, for example by the following calculation:

$$\Psi = \arctan\left(\frac{v_{air_e}}{v_{air_n}}\right)$$

with $v_{air_e}$, $v_{air_n}$ being the respective projections of the normed air speed on the east and north axes of the local coordinate system {north, east, centre}.

9. Method according to claim 7, wherein it also consists in carrying out a check on the integrity of the speed information delivered by one or more anemometric systems that the aircraft includes by comparison with the speed $\vec{V}_{air}$ of the aircraft relative to the air.

10. Method according to claim 1, wherein it also consists in carrying out a check on the integrity of the anemometric speed information delivered by one or more anemometric systems that the aircraft includes by comparing the variation of said anemometric speed with the variation of the geographic speed $\vec{V}$.

11. Method according to claim 1, wherein it consists in carrying out a preliminary check on the integrity of the radio navigation signals received by applying a method of independently checking the integrity of the measurements.

12. An on-board system for determining navigation parameters of an aircraft comprising:
   at least one single-antenna radio navigation receiver configured to receive radio navigation signals originating from a plurality of radio navigation satellites in sight of the aircraft; and
   a processor coupled to said receiver and configured to determine components indicative of the geographic speed $\vec{V}$ of the aircraft, expressed in a given local fixed coordinate system $\{\vec{i}, \vec{j}, \vec{k}\}$, based on the measurements $m_i$ of carrier phase increments $\Delta\phi_i$ of the radio navigation signals, each of said measurements $m_i$ constituting an estimate of the relative speed of the aircraft relative to each of the plurality of satellites projected onto the sight axis linking the aircraft to each respective satellite, each of said measurements m, being compensated by the apparent radial speed of the respective satellite.

13. The system according to claim 12 wherein the processor is further configured to determine the acceleration $\vec{\gamma}$ of the aircraft in the local coordinate system $\{\vec{i}, \vec{j}, \vec{k}\}$, based on a measurement $\vec{\gamma}_i$ of the derivative over a given time period of the phase increments $\Delta\phi_i$, each of said derivative measurements $\vec{\gamma}_i$ constituting an estimate of the relative acceleration of said aircraft relative to said satellite projected onto the sight axis between the aircraft and the satellite to which is added the apparent acceleration $\vec{\gamma}_i^a$ of the satellite in the direction of said sight axis to obtain the total acceleration $\vec{\gamma}_i^p$ of the aircraft in the satellite sight axis.

14. The system according to claim 13 wherein the processor is further configured to determine the roll angle Φ of the aircraft based on the geographic speed $\vec{V}$ of the aircraft expressed in the geographic coordinate system {north, east, centre} and the specific force $\vec{f}$ applied to the aircraft, the force $\vec{f}$ being deduced from the acceleration $\vec{f}$ by subtracting from it the Earth's gravitational field, the roll angle Φ being calculated using the following relationship:

$$\Phi = a\tan\left(\frac{v_n \cdot f_{H_e}(\vec{v}) - v_e \cdot f_{H_n}(\vec{v})}{-f_{H_c}(\vec{v})}\right)$$

in which $v_n$ and $y_e$ are the normed components of the direction of the geographic speed $\vec{V}$ on the east and north axes of the local coordinate system {north, east, centre} and $\vec{f}_H(\vec{v}) = \vec{f} - (\vec{f} \cdot \vec{v})\vec{v}$ is the projection, on the plane orthogonal to the displacement of the aircraft, of the specific force $\vec{f}$.

15. The system according to claim 12 wherein the processor is further configured to determine the pitch angle θ on the basis of the geographic speed $\vec{V}$ of the aircraft expressed in the geographic coordinate system {north, east, centre}, for example by the following calculation: θ=arcsin(−$v_c$), in which $v_c$ is the projection of the normed geographic speed $\vec{V}$ onto the centre axis of the coordinate system.

16. The system according to claim 12 wherein the processor is further configured to determine the speed $\vec{V}_{air}$ of the aircraft relative to the air by subtracting from the geographic speed $\vec{V}$ of the aircraft an estimate of the wind, speed $\vec{V}_{vent}$.

17. The system according to claim 16 wherein the processor is further configured to determine the heading angle ψ based on the speed $\vec{V}_{air}$ of the aircraft relative to the air expressed in the geographic coordinate system {north, east, centre}, for example by the following calculation:

$$\Psi = \arctan\left(\frac{v_{air_e}}{v_{air_n}}\right)$$

with $v_{air_e}$, $v_{air_n}$ being the respective projections of the normed air speed on the east and north axes of the local coordinate system {north, east, centre}.

18. The system according to claim 16 wherein the processor is further configured to check on the integrity of the speed information delivered by one or more anemometric systems that the aircraft includes by comparison with the speed $\vec{V}_{air}$ of the aircraft relative to the air.

19. The system according to claim 12 wherein the processor is further configured to carry out a check on the integrity of the anemometric speed information delivered by one or more anemometric systems that the aircraft includes by comparing the variation of said anemometric speed with the variation of the geographic speed $\vec{V}$.

20. The system according to claim 12 wherein the processor is further configured to carry out a preliminary check on the integrity of the radio navigation signals received by applying a method of independently checking the integrity of the measurements.

* * * * *